Patented June 19, 1928.

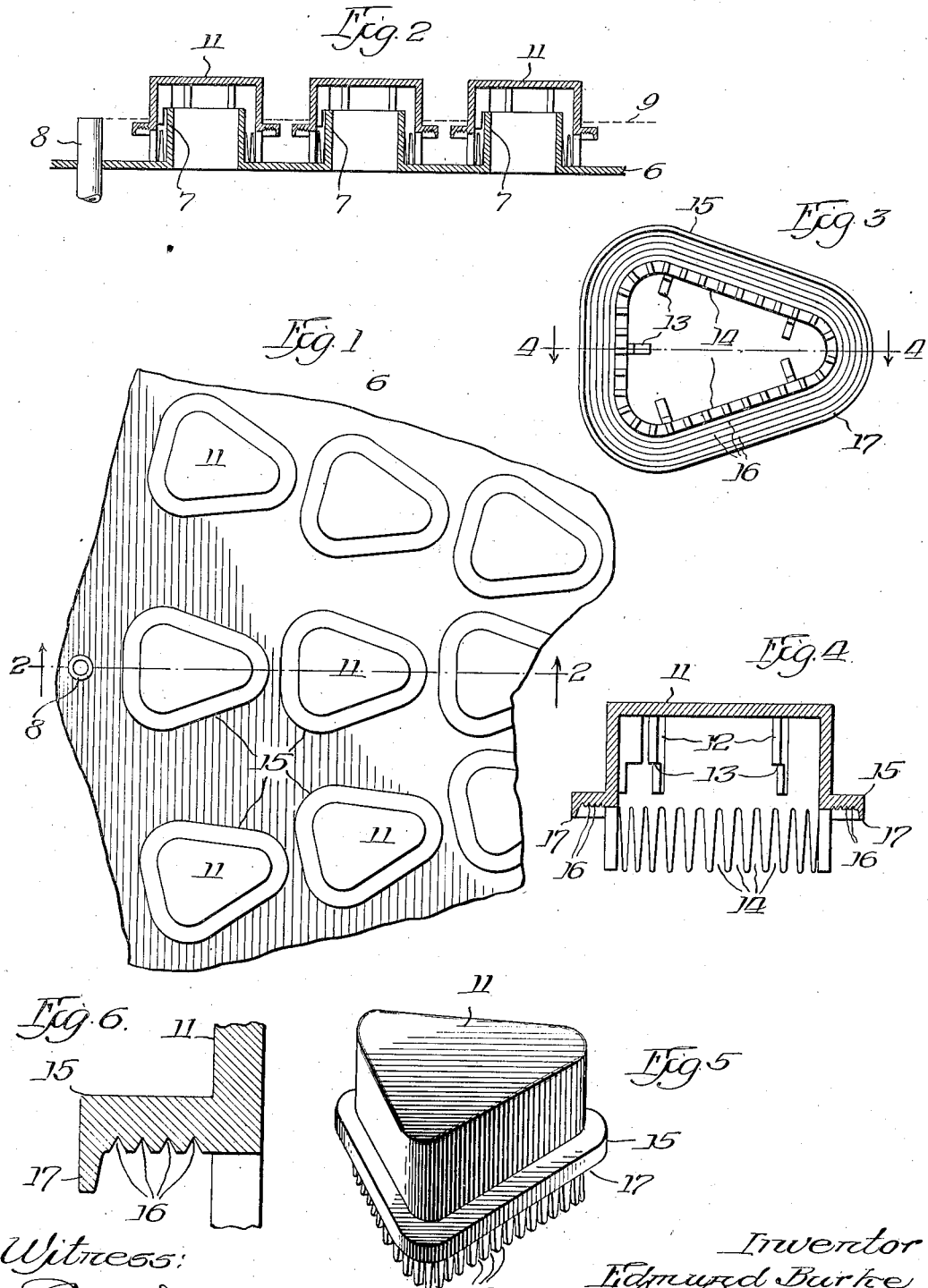

1,674,464

UNITED STATES PATENT OFFICE.

EDMUND BURKE, OF OAK PARK, ILLINOIS, ASSIGNOR TO CRANE CO., OF CHICAGO, ILLINOIS, A CORPORATION OF ILLINOIS.

BUBBLE CAP FOR BUBBLE-CAP TOWERS.

Application filed April 11, 1927. Serial No. 182,907.

This invention pertains in general to the condensation and fractional distillation of liquids or liquid vapors of various characters, and has more particular reference to devices known as bubble caps which may be employed for condensation or fractional distillaton of volatile products or by-products derived or extracted from petroleum, shale, coal, grain, etc. Bubble caps of the character specified are employed in what are ordinarily known as bubble towers, for the purpose of causing intimate contact between the vapor distilled off and the liquid through which it is passed for various purposes. For simplicity of illustration and description the invention will be described with reference to oil distillation although it will be apparent the invention may be utilized for other purposes.

One of the primary purposes of my invention is to provide a bubble cap which will thoroughly distribute the vapors through the liquid through which it passes and cause the vapors to remain in intimate contact with the liquid a greater period of time than has heretofore been possible by the use of other bubble caps and without increasing the back-pressure on the vapors, thereby producing a greater condensation of the vapors and a more efficient distillation.

Another object is to prolong the period of intimate contact between the vapors and liquids without increasing the back pressure in the tower and without reducing the size of the slots in the cap so that they are liable to become stopped up by corrosion and the lodgment of foreign matter.

My improved bubble cap is also designed to furnish maximum heat transference capacity, to avoid entrainment of the liquids, to minimize corrosion and stoppage and to accomplish other advantageous results which will be apparent as my invention becomes better understood by reference to the following description when considered in connection with the accompanying drawings.

Referring to the drawings:

Fig. 1 is a fragmentary plan view of a bubble tower deck equipped with bubble caps embodying my invention, Fig. 2 is a vertical sectional view taken on the line 2—2 of Fig. 1, Fig. 3 is a plan view of one of my novel caps in inverted position, Fig. 4 is a sectional view on the line 4—4 of Fig. 3, Fig. 5 is a perspective view of one of the caps, and Fig. 6 is an enlarged fragmentary section of a portion of one of the caps.

Referring now to the drawings more in detail, reference character 6 indicates one of the horizontal decks of a bubble tower, these decks being customarily provided with upstanding spouts or necks 7 through which the distilled vapors arising from the next lower deck are discharged.

Condensed liquid oil is maintained on each deck at a suitable height, something less than the height of the neck 7, the height of this liquid being determined by the position of the upper end of the downflow or weir 8, by which the surplus liquid is returned to the next lower deck. This liquid height varies in different installations, but for purposes of illustration I have indicated an average liquid level by a dotted line 9 in Fig. 1. The construction thus far described is that commonly in use in bubble towers. Each of the necks 7 is covered by a bubble cap designed to direct the vapors entering the cap through the neck downwardly below the liquid level so that the vapors in escaping will pass through and in intimate contact with the liquid whereby these vapors are partially condensed. My improved cap, designated generally by reference character 11, may be of any preferred metal and while it is shown herein as being somewhat triangular in shape, it should be appreciated that it may be of any plane figured shape or form without detracting from the applicability of the invention.

Upon its interior, the cap is provided with a plurality of reinforcing ribs, each shaped to provide a supporting shoulder 13 adapted to rest upon the upper end of neck 7, whereby the weight of the cap is supported. The lower end of the cap may reach into close proximity to or be spaced some distance above the deck 6, depending upon the length of the neck which supports the cap, upon the length of the cap itself, the depth of the oil on the deck and other factors.

The lower portion of the walls of the cap, that is, that portion which is normally submerged in the liquid, is provided with longitudinally disposed slots 14, sufficiently narrow and numerous to divide the issuing vapor into a number of comparatively fine streams and at the same time sufficiently large so as not to cause excessive back pressure in the tower or be liable to be stopped up by corrosion or foreign matter deposited therein. The vapor issuing under pressure through these slots enters the surrounding liquid with which it comes in intimate contact, part of the vapor is condensed in the liquid, and the remainder, the more volatile vapor, bubbles up through the liquid escaping at the top thereof where froth, consisting of a mixture of liquid oil and vapors, usually collects to a depth of several inches.

The bubble caps with which I have been familiar prior to the present invention have been so designed that the vapors passing out through the slot would immediately rise in the liquid in close proximity to the cap and would remain in the liquid only a very brief period. My invention is designed to prolong this intimate contact between the vapors and the liquid by causing the vapors to travel farther in the liquid away from their point of exit from the cap than has heretofore been done, and this prolonged travel, by prolonging the period of intimate contact, increases the vapor condensation in the liquid, thereby increasing the efficiency of the apparatus.

With this end in view I have provided my bubble cap at a point above the slots 14, but below the liquid level on the deck, with a circumferential horizontally extending flange or web 15 which precludes the rise of the vapors to the surface of the liquid immediately upon their issuance from the slots 14 and causes these vapors to travel in the liquid to the outer perimeter of the flange before they can escape. While the flange or web 15 may of itself be sufficient to prolong the period and amount of travel of the vapors through the liquid to the extent and for the purpose described, I prefer to provide an arrangement whereby contact for an even greater period and distance may be obtained. To this end the lower surface of the flange or cap 15 is provided with a series of grooves 16 and with a downwardly depending lip 17 all of which serve to increase the distance of travel of the vapors through and the period of their contact with the liquid through which they are destined to pass.

This prolongation of the path of travel and of the time during which the vapors are in intimate contact with the liquid increases the amount of condensation of the vapors, thereby correspondingly increasing the efficiency of the apparatus.

While I have shown and described a preferred embodiment of my invention, the structural details shown for illustrative purposes merely may obviously be varied within wide limits without departing from the essence of the invention as defined in the following claims.

I claim:

1. A bubble cap provided in its lower portion with outlet slots, and means above said slots for directing the escaping vapors outwardly away from said slots.

2. A bubble cap provided in its lower portion with outlet slots and having a horizontally projecting flange disposed above said slots.

3. A bubble cap the walls of which provide an inverted cup, a laterally and outwardly projecting surrounding flange between the top and bottom edges of the walls of the cup, a plurality of grooves in the bottom surface of said flange, substantially parallel with one another and extending transverse to the general path of vapor flow from said cap, and a lip depending from the bottom surface of said flange at its outer edge and extending below the bottom surface thereof, the bottom edge of said cap having a series of apertures thereabout for the escape of vapors from within the cap.

4. A bubble cap having a perimetrical laterally projecting flange between its top and bottom edges, said flange having a grooved undersurface, the grooves in said surface being disposed transverse to the general path of vapor flow.

In witness of the foregoing I affix my signature.

EDMUND BURKE.